G. A. LYON.
NON-SKIDDING ATTACHMENT FOR WHEEL TIRES.
APPLICATION FILED DEC. 9, 1910.
1,115,221.
Patented Oct. 27, 1914.
2 SHEETS—SHEET 1.
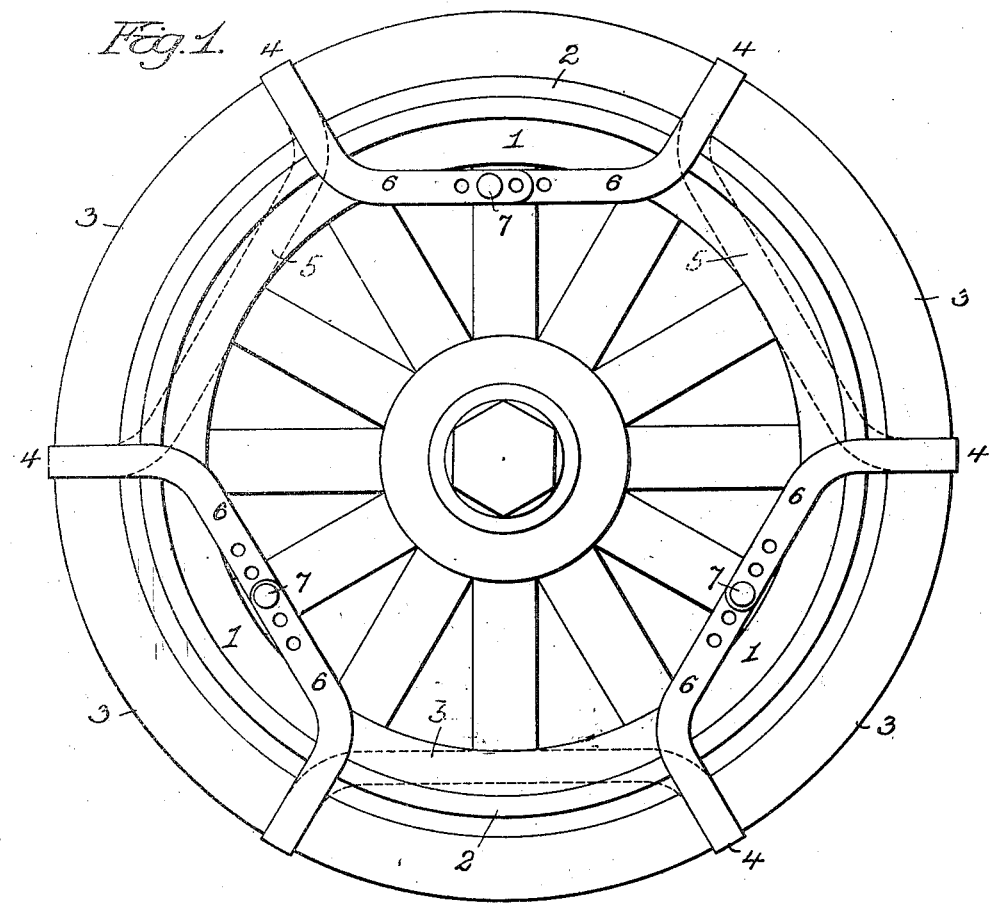
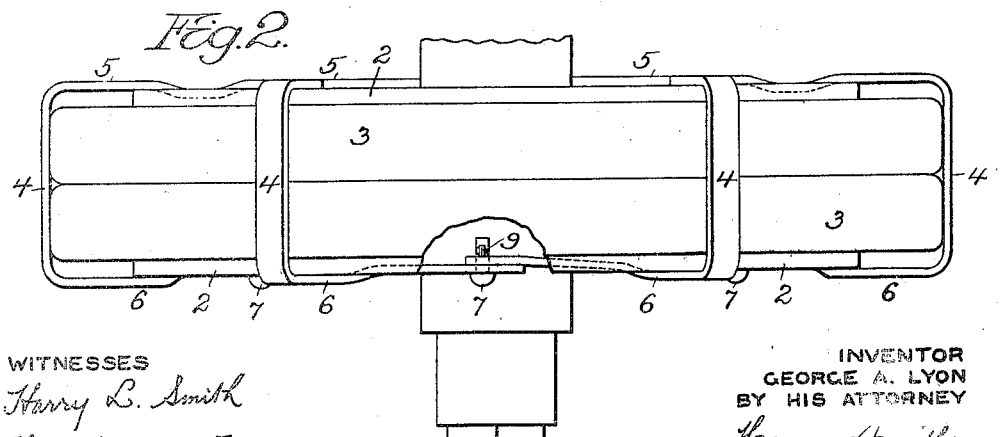
WITNESSES
Harry L. Smith
Hamilton S. Turner
INVENTOR
GEORGE A. LYON
BY HIS ATTORNEY
Harry Smith

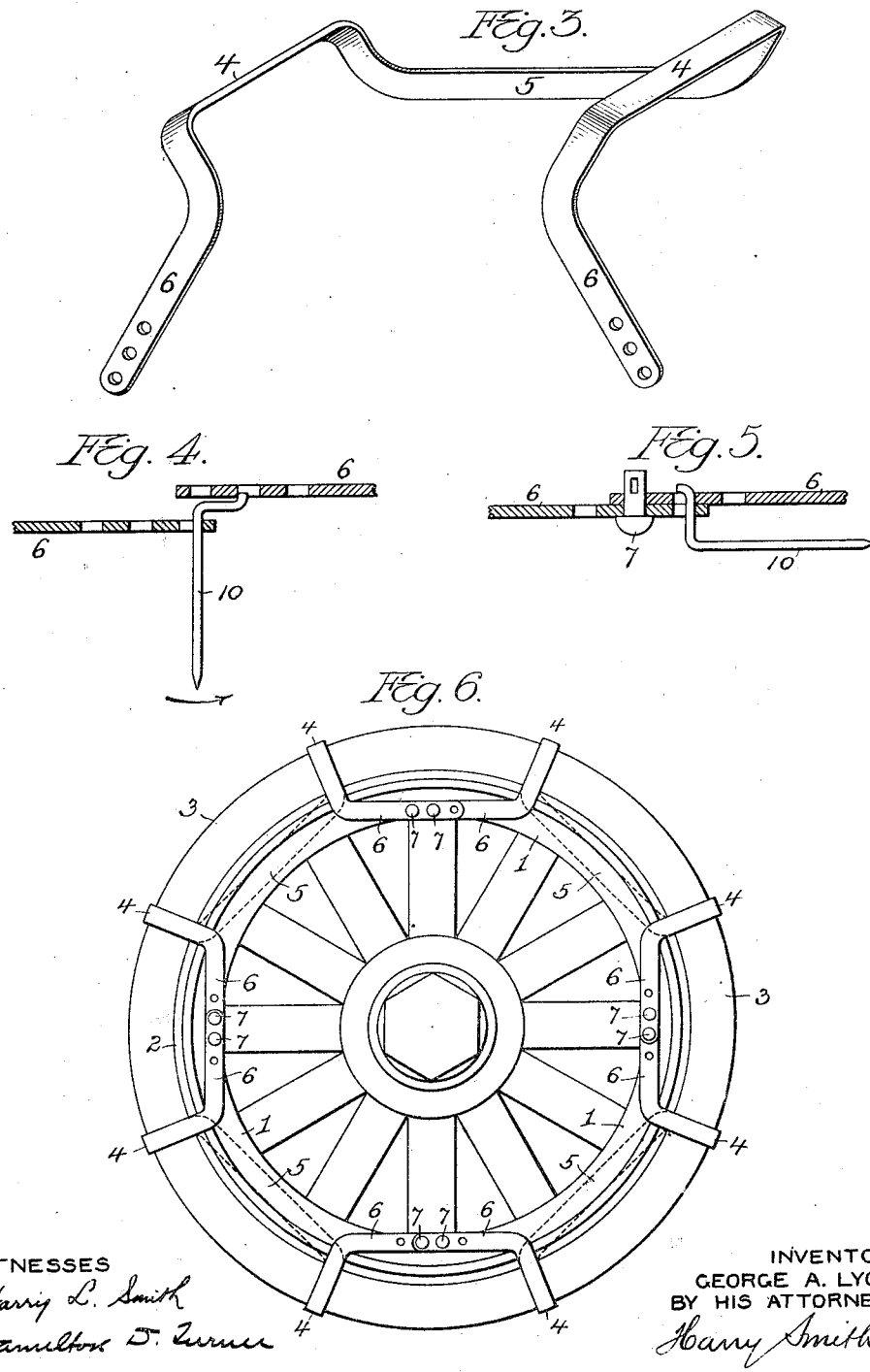

UNITED STATES PATENT OFFICE.

GEORGE ALBERT LYON, OF PHILADELPHIA, PENNSYLVANIA.

NON-SKIDDING ATTACHMENT FOR WHEEL-TIRES.

1,115,221.  Specification of Letters Patent.  Patented Oct. 27, 1914.

Application filed December 9, 1910.  Serial No. 596,521.

*To all whom it may concern:*

Be it known that I, GEORGE ALBERT LYON, a citizen of the United States, residing in Philadelphia, Pennsylvania, have invented certain Improvements in Non-Skidding Attachments for Wheel-Tires, of which the following is a specification.

My present invention consists of certain modifications of or improvements in the attachment for wheel tires for which I have filed applications for Letters Patent on the third day of June, 1909, Serial No. 499,199, and on the twenty-fifth day of October, 1909, Serial No. 525,283, the objects of my invention being to so construct the attachment as to insure relative rigidity of the sections when they are connected together, so that there will be no movement of the sections in respect to one another and consequent wear at the points of connection; to simplify and cheapen the construction of the attachment; to reduce to a minimum the number of parts comprising the same, and to permit adjustment of the attachment to adapt it to varying diameters of tires. These objects I attain in the manner hereinafter set forth, reference being had to the accompanying drawings, in which—

Figure 1 is a face view of the wheel having my attachment applied thereto; Fig. 2 is a top or plan view of the wheel with the attachment thereon, part of the wheel being broken away to show the connection between two sections of the attachment; Fig. 3 is a perspective view of one of the sections of the attachment; Figs. 4 and 5 are sectional views illustrating the means for and manner of tightening the sections upon the tire and securing together the overlapping sections of the attachment, and Fig. 6 is a face view of a wheel, drawn on a smaller scale, than Fig. 1, and illustrating a means for rigidly connecting the sections together to form a complete rigid attachment when the latter is composed of more than three sections.

In Figs. 1 and 2, 1 represents the felly of the wheel, usually of wood, this felly however, being provided, by preference, with an external metallic ring which projects on each side of the felly so as to form an annular flange 2. Upon this ring is mounted in any ordinary manner the rubber tire 3 of the wheel to which my improved attachment is applied.

The attachment is composed of similar sections, preferably three in number, for a purpose hereinafter set forth. Each section of the attachment is composed of a flat strip of bar steel of appropriate dimensions, and of oblong cross section with rounded corners, each of these strips being bent so as to form a plurality of tread members 4, resting flat upon the surface of the tire and extending across the same from side to side. An intermedial side member 5 forms a rigid continuation of the tread members 4 of the same section. Said intermedial side members 5 of the several sections are located on the inner side of the wheel. The tread members 4 are also provided with side members 6, located upon the outer side of the wheel. Said side members 6 of the tread members 4 of the same section are bent so as to project in opposite directions, one forwardly and one rearwardly from the tread members of the sections. The side members 6 of one section of the attachment overlap the members 6 of the adjoining section, as shown in Fig. 1, and these overlapping side members are connected together preferably in such a way as will provide for adjustment of one in respect to the other in order to tighten the attachment upon the tire or to take up the attachment to compensate for wear of the tire, or to adapt one attachment for use in connection with tires of different diameters. In the present instance the overlapping side members 6 of adjoining sections of the attachment are are together by passing a bolt 7 through registered openings in said overlapping side members, the bolts being retained in position by providing the same at one end with a suitable head or enlargement and by providing the stem of the bolt with a slot for the reception of a suitable cotter pin or key 9, the head of the bolt bearing upon the outer face of the overlapping side member 6 and the cotter pin or key bearing upon the inner face of the underlapping side member 6, as shown in Fig. 2. The bolt, however, may be reversed if desired.

In order to draw the sections of the attachment together and tighten the same upon the tire prior to the application of the retaining bolt 7, I use a bent lever 10, as shown in Figs. 4 and 5, the end portion of this lever being applied to an opening in the underlapping side member 6, while the stem of the lever occupies an opening in the overlapping member beyond that to which the inner end of the lever is applied, the bent portion of the lever lying between the two members, as shown in Fig. 4. By moving the lever in the direction of the arrow, Fig. 4, the overlying and underlying members 6 of the adjoining sections of the attachment are caused to move past one another, this movement continuing until the desired openings of the two side members 6, other than those to which the lever 10 is applied, are brought into registry with one another, as shown in Fig. 5, whereupon the retaining bolt 7 is inserted into such registered openings and the sections of the attachment are thereby retained in proper position, the lever 10 being free to be withdrawn from the openings to which it was originally applied. It is only necessary to act in this manner upon the side members 6 at one of the three points where said side members overlap each other, the overlapping members at the other two points having previously been connected together by means of the bolts and the operation of tightening the attachment upon the tire may, if desired, be assisted by pounding or hammering upon the tread members of the attachment during the time that the side members 6 are being drawn together by the action of the lever 10. One end of the lever 10 is preferably flattened or tapered as shown in Fig. 5, so that it may act as a screw driver or as a wedge for spreading the split cotter key 9 after the same has been passed through the slot in the retaining bolt 7.

By the use of but three sections in the attachment, the three points of connection between said sections occupy the apices of an approximately equilateral triangle and thereby serve to rigidly secure the several sections together so as to prevent any movement of one section in relation to the other sections of the attachment, this result being attained even if the attachment is not applied to the tire. When the attachment is composed of more than three sections, as shown in Fig. 6, the rigidity of the attachment may be maintained by using two bolts 7 to secure the overlapping side members of adjoining sections together, thus preventing any pivotal movement between the adjoining sections and forming a complete rigid structure.

The intermedial side members 5 on one side of the wheel and the overlapping side members 6, on the opposite side of the wheel, present their longer axes in a radial line. The said intermedial side member 5 rigidly holds the tread members 4, between which it forms a continuation, in a position with their longer axes at right angles to a radial line and prevents the tread members of the same section from rocking upon the tire, and, by reason of the rigid construction of the complete attachment, I prevent any movement between the sections and thereby prevent the tread members of adjoining sections from having any lateral twisting movement which would cause them to rock and bite into the material of which the tire is composed. The intermedial side members 5 and the overlapping side members 6 being arranged as above stated with their longer axes in a radial line, said parts will present their broader surfaces parallel with the sides of the wheel and the tension upon the intermedial side members 5 and the side members 6 when the sections are connected under tension, will cause them to bend slightly upon their broader surfaces, as shown by dotted lines in Fig. 2, and the tread members may assume a position slightly at an angle to the axis of the wheel. This also occurs when one tread member is in contact with the ground and power is applied to rotate the wheel. The tread members other than the one in contact with the ground will then assume a slightly diagonal position across the tread of the wheel and the side members will bear tightly against the sides of the wheel. The bending of the side members upon their broader surfaces is very slight and only occurs when the sections are under tension, as all of the parts are of sufficient dimensions to insure the relative rigidity of the complete structure forming the attachment.

The connections between the sections are all on the outside of the wheel and are consequently readily accessible and the side members forming the points of connection extend sufficiently beyond the felly toward the center of the wheel to allow the connecting pins to be readily made fast. The intermedial side members 5 of each section are on the inside of the wheel and do not project toward the center of the wheel as far as the outer side members, thus giving more room for the driving mechanism upon the wheel. The intermedial side members 5 present their flat surface to the side of the wheel and thus project but a very short distance from the same and will not interfere with the driving sprocket chain usually located close to the inside of the wheel.

Owing to the fewness of parts comprising my improved attachment and to the simplicity of construction of each of these parts, the cost of the attachment is reduced and the application of the attachment to the tire and the tightening of the same on the tire is so simplified that it can be effected quickly and without trouble or the exercise of skill by the person applying the attachment.

I claim:

1. A non-skidding wheel tire attachment comprising a plurality of sections, each section having a plurality of tread members and a side member rigidly connecting the same on one side of the wheel, and means disposed on the opposite side of the wheel for directly but detachably connecting said sections together to form a relatively rigid attachment.

2. A non-skidding attachment for wheel tires comprising three sections, each presenting a plurality of tread members rigidly disposed in relation to each other, and means for attaching the ends of adjoining sections together, said points of connection bearing the relation to each other of the apices of an equilateral triangle, whereby rigidity of the attachment is insured.

3. A non-skidding attachment for wheel tires comprising three sections, each presenting a plurality of tread members, an intermedial side member forming a relatively rigid continuation of said tread members at one side of the wheel and oppositely projecting side members at the other side of the wheel, and means for attaching the said side members of adjoining sections together, said points of connection bearing the relation to each other of the apices of an equilateral triangle whereby rigidity of the attachment is insured.

4. A non-skidding attachment for wheel tires comprising sections, each presenting a plurality of tread members of oblong cross section, intermedial side members forming a relatively rigid continuation of said tread members on one side of the wheel, and side members oppositely projecting from the tread members on the other side of the wheel, the side members at the ends of adjoining sections overlapping and being secured together to form relatively rigid continuations of the tread members, and said overlapping side members and said intermedial side members being of oblong cross section and presenting their longer axes in a radial line whereby they can bend upon their broader surfaces when applied to the wheel under tension.

5. A non-skidding attachment for wheel tires comprising side members and tread members, the side members on the inner side of the wheel being farther from the center of the wheel than the outer side members.

In testimony whereof, I have signed my name to this specification, in the presence of two subscribing witnesses.

GEORGE ALBERT LYON.

Witnesses:
KATE A. BEADLE,
HAMILTON D. TURNER.